April 26, 1966  J. G. CRUMP  3,248,541
RADIOACTIVITY DEVICE FOR MEASUREMENT
OF PROPERTIES OF MATERIALS
Filed Aug. 20, 1962  2 Sheets-Sheet 2
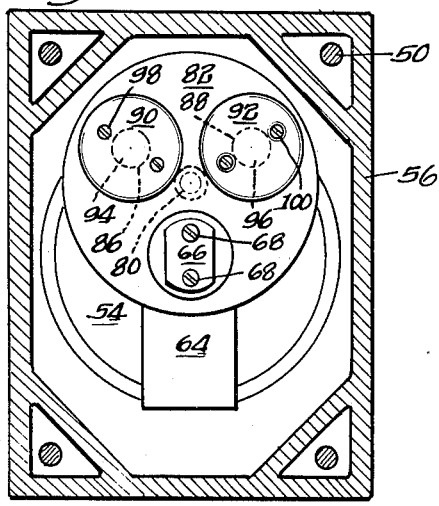
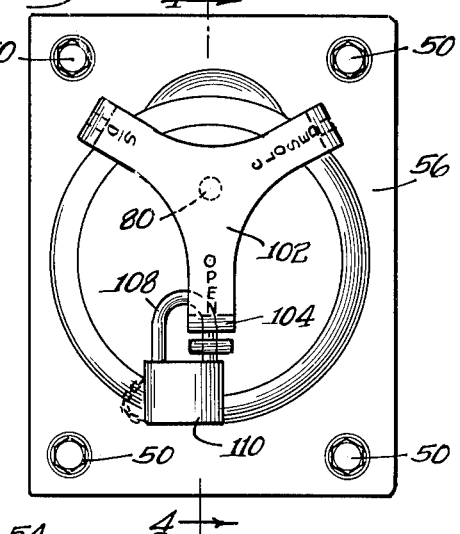
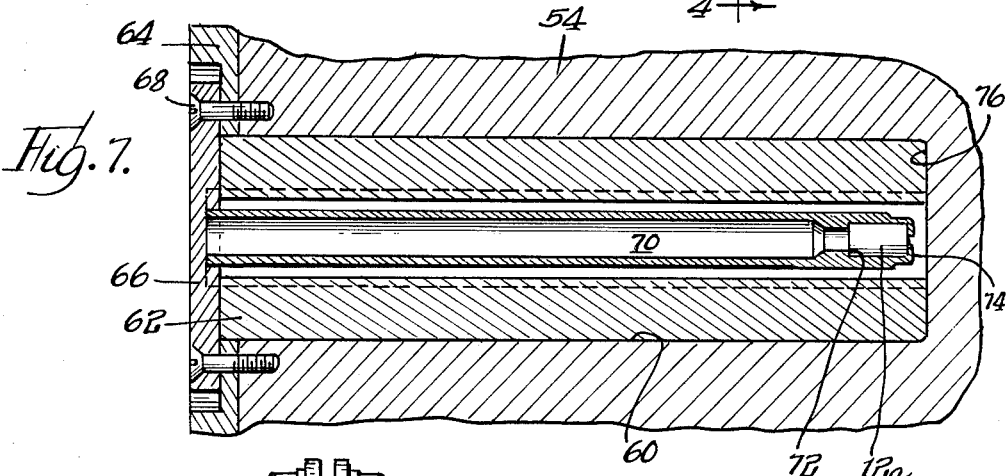
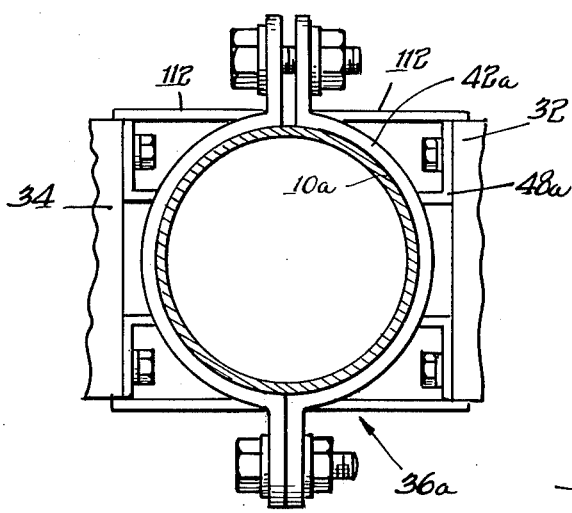
INVENTOR.
Jack G. Crump
BY
Stone Nieman
Burmeister & Zimmer
attys.

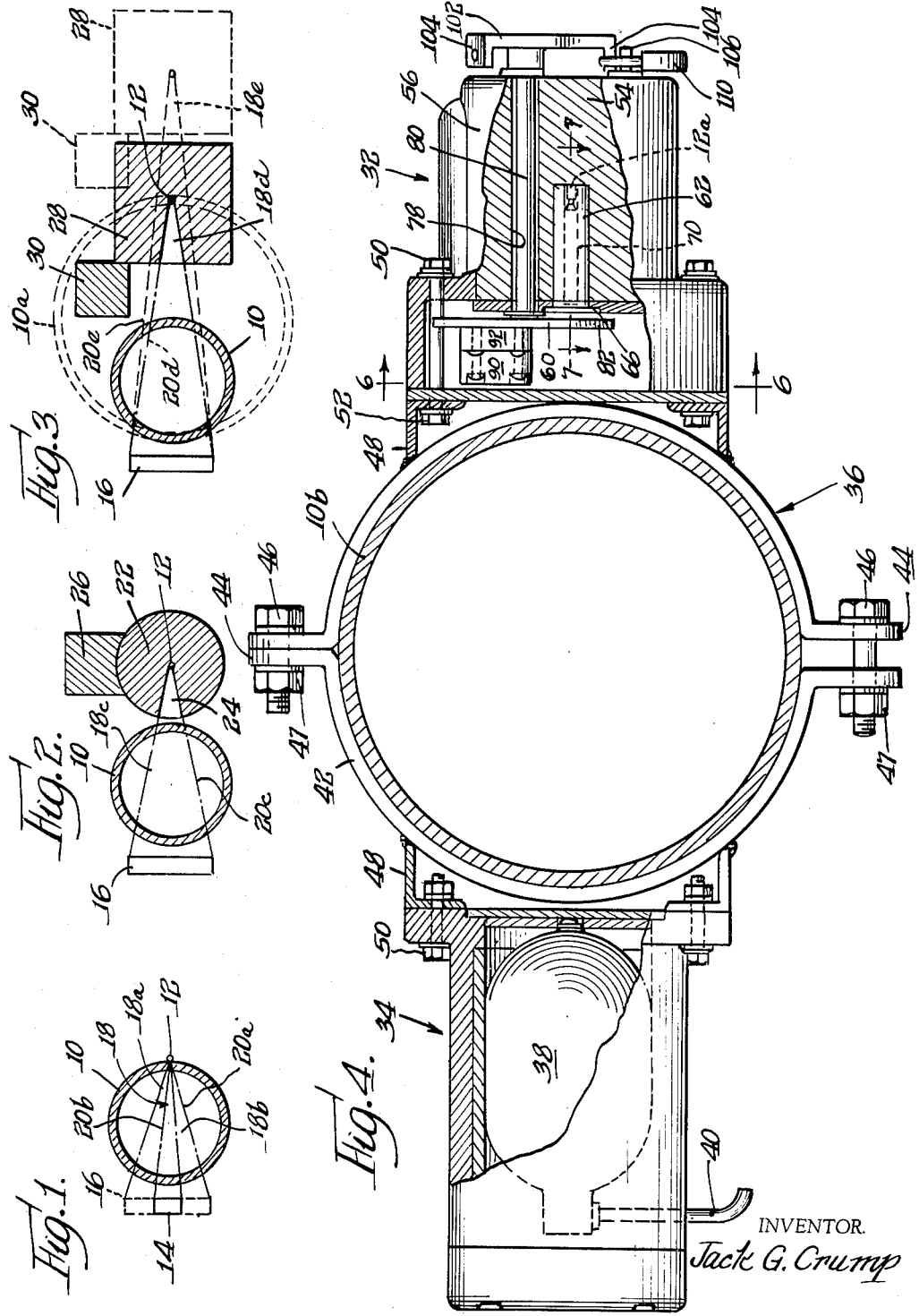

United States Patent Office 3,248,541
Patented Apr. 26, 1966

3,248,541
RADIOACTIVITY DEVICE FOR MEASUREMENT OF PROPERTIES OF MATERIALS
Jack G. Crump, Arlington Heights, Ill., assignor to Nuclear-Chicago Corporation, Des Plaines, Ill., a corporation of Delaware
Filed Aug. 20, 1962, Ser. No. 220,958
15 Claims. (Cl. 250—43.5)

This invention relates to devices for measurement of properties of materials by use of radioactivity, and specifically to devices for practicing methods of producing indications of characteristics of materals, such as density and the like, in industrial processes, in which a radioactive source (gamma-rays normally being employed) is placed one one side of the flow-path and a radioactivity detector on the other side, the response of the detector indicating the measured property of the material, thus permitting continuous control. The invention relates particularly to source-and-detector apparatus for continuous measurement and indication of density of fluids (normally liquids) in the pipes of round cross-section commonly used for continuous (or batch) materials-flow systems involving liquid or liquid-like materials.

The general concept or theory of measuring density for purposes of permitting process control by measuring the attenuation of gamma-ray transmissions across a pipe, tank, or similar container has been known for many years. From a theoretical standpoint, such a type of measurement appears extremely simple, the increase of gamma-ray attenuation with density being well known, and it being an apparently simple matter to bombard one side of a pipe with gamma-rays and to calibrate the output of a detector on the opposite side in terms of the density of the particular fluid being used. Normally, of course, in any given process, variations in density are directly indicative of desired information concerning relative feed-rates of component materials and similar information concerning correctness of process conditions, so that there exist a large number of uses for such devices, in most of which there is no adequate substitute for the gamma-transmission method, such laborious and time-lag-creating procedures as sampling and weighing being the only methods of process control presently available in many instances. The fairly limited use of the gamma-ray transmission method of density monitoring over the decades since it first became known is due to the practical problems which are encountered when it is sought to design equipment utilizing the method which is capable of the degree of accuracy normally required in such industrial processes, while at the same time being practical from both the standpoint of cost and complexity and that of compatibility with the space limitations and absence of health hazards to personnel which must be met before such devices can be widely used. Upon careful examination, it is found that these requirements are not, as may first appear to be the case, independent. Individually, each of these problems is not very difficult to solve. However, it is found that these and other factors of practicality are in fact interrelated in such a manner that the devices heretofore provide or known for the purpose have been deficient in one respect or another to an extent which has severely limited the actual utilization of such devices. It is the principal object of the present invention to provide such a device which satisfies all of the practical requirements for widespread use of the gamma-ray transmission method of measuring density of process fluids in industrial processes to a degree not heretofore attained.

For understanding of the present invention, it is necessary to first point out the practical problems encountered, and not heretofore solved, with prior art devices for the same general purpose. As with other devices employing radioactivity, and particularly with "hard" or penetrating radiations such as gamma-rays, adequate shielding must be made practical. There being no way of directing or focusing radiations such as gamma-rays, it is necessary, in virtually any sort of device using a source and detector for measurement or similar purposes, to provide appropriate shielding of the source in all directions in order to prevent the existence of radiation fields in the neighborhood of the device sufficient to create a health hazard. The amount of shielding, of course, varies with the magnitude or intensity of the source. The only materials capable of fairly large absorption in any kind of reasonable thicknesses are high-density materials of which lead is the commonest example. The necessity of providing bulky and heavy shielding, when coupled with the magnitude of the hazard resulting from catastrophic accident, in addition to the factor of cost, put an effective ceiling on the intensity or size of the sources that can be employed. As a practical matter, although sources as large as 2 curies have occasionally been used for special industrial measuring purposes, any source substantially greater in magnitude than 1 curie is generally considered as unsuitable for use in routine-type measuring installations, and for many purposes sources in excess of one-half curie are considered prohibitive.

For some purposes, of course, sources of the sizes mentioned are more than adequate, even for the most accurate of measurement, and relatively small sources may be employed. But for density measurements of the type presently under discussion, the exact construction employed is found highly critical in determining whether measurements of adequate accuracy can be made with the largest of permissible sources. Additionally, the shielding can, unless the most desirable of construction features are employed, become of such mass and bulk as to make proper support of the measuring device an extremely severe, if not impossible, problem, particularly in view of the very limited space available in the region of the piping in many, if not most, industrial installations. The problem of shield mass and bulk is particularly acute in measuring systems designed so that the sole support for the measuring system will be the pipe being monitored; support of the device in this manner is in many, if not most cases a vital requirement, not onyl because the provision of the floor-space and fairly elaborate structure required for independent support are normally prohibitive, but also because such independent support in general loses the constancy of orientation of the source and detector with respect to the monitored pipe which is obviously required for reasonable constancy of calibration and meaningfulness of the measuring results.

An additional problem, interrelated with those just discussed, is the necessity that the measurements must not only be accurate, but also must be made in a very limited time, particularly in the common cases where the flow rates are such that rapid indication of changes in the monitored density must be promptly indicated in order that the entire measuring device be of utility for its intended purpose. In this requirement, there enters another problem inherent in all measurements employing radioactivity sources, this being the statistical or random individual occurrences which form any given average rate of detection of individual particles or quanta. As is well known, in any measurement of radioactivity, whether by actual counting of individual events or by averaging of rate of occurrence by the integrating or "time-constant" technique, statistical variations introduce errors which vary, for any fixed time, with the average occurrence rate. Accordingly, to give the required degree of accuracy in a measurement of the type normally required for industrial process control, the counting rates must be sufficiently high, when combined with the interval of the measurement, to assure that the accuracy of the measurement is not limited beyond the permissible error by the statistical variations in detection rate.

In the case of the density measurement here under discussion, it is inherently a requirement for accuracy of measurement, even given an infinity of time for a measurement (thus excluding the question of statistical error), that there be a large amount of absorption of the source radiations in traversing the medium under measurement, under the requirements imposed on any type of device for making such a measurement, i.e., the usual factors of practicality and economics which limit the accuracy of any instrument for measuring any quantity; because the measurement here involved is basically a measurement of absorption per unit thickness, the measurement or monitoring of small changes in density requires for practicality the passage of the incident rays through sufficient thickness of the material under measurement to produce a high degree of sensitivity.

The limits on the source size which can be used, together with the necessity of large amounts of absorption for accuracy, and together with the further necessity for reasonably high counting rates at the detector in order to permit usably low measuring times (overlapping where counting-rate-meter or ionization chamber type of measurement is used with a circuit time-constant) have created the necessity for "source utilization" constructions and designs for the purpose of obtaining the desired accuracy of the measurement, including the statistical fluctuation limits, with practical source sizes.

As will hereinafter be pointed out, the factors mentioned above have long since been encountered in the design of commercial instruments for measurement of density and similar properties in industrial process systems, particularly in pipes, but attempts to meet these problems previously made have proved far from satisfactory. Even in the "in-line" commercial instruments available prior to the present invention (i.e., instruments including a special built-in pipe section designed for insertion in a piping system), the problems of obtaining the necessary accuracy without undue source size have not previously been solved. In the so-called "clamp-on" type of density gauge, i.e., a gauge designed for external application to existing pipes, the constructions known before the present invention were even more unsatisfactory. In the case of the clamp-on type of unit, there are numerous problems involved which are much more easily solved where the special pipe section is incorporated as a part of the device. Among the most important are the necessity of tolerating the additional absorption introduced by the pipe (avoided by the use of special materials, thickness, etc., in the "in-line" type), and the necessity of providing "shut-down" mechanism for the complete shielding of the source to permit handling and installation on a pipe (not required in the case of the "in-line" type of device because the source is not exposed to the exterior at any time in such a device, the entire assembly including the pipe being unitary).

It is accordingly the principal specific object of the present invention to provide a "clamp-on" type of radioactivity source-and-detector density gauge which produces measurements of high accuracy with sources of reasonably small size, and which is sufficiently compact and inexpensive for widespread use in industrial processing systems. In achieving this object, there have been devised novel constructions which may be adapted to other uses, particularly to other uses of radioactivity in industrial processes for measurements. The invention is of particular advantage in clamp-on density gauges of the "universal" type, in which the spacing between the source and detector is adjustable for use on a variety of sizes of pipes, by adjustment of a single mounting means or by selection.

The manner in which the present invention accomplishes these objects, and the nature of the improvement thereby effected, will best be understood by description with reference to the attached drawing, in which:

FIGURE 1 is a schematic illustration of an approach or construction heretofore commonly used in density gauges for measurements on fluids in pipes, previously thought to maximize source utilization;

FIGURE 2 is a schematic illustration generally corresponding to FIGURE 1 but showing in elementary form an improved "geometry" of the source and detector for producing high accuracy of measurement in accordance with the present invention;

FIGURE 3 is a schematic illustration of a further improvement in the geometry, illustrating the application of the present invention to measurements on fluids in pipes of different diameters;

FIGURE 4 is a view partially in side elevation and partially in vertical section showing a source-and-detector clamp-on density gauge constructed in accordance with the invention;

FIGURE 5 is a view in elevation of the outer end of the source housing of the device of FIGURE 4;

FIGURE 6 is a sectional view of the source housing of the device of FIGURE 4 taken along the line 6—6 in the direction indicated by arrows in that figure, the parts or elements inside the housing being shown in elevation;

FIGURE 7 is an enlarged detail view of a portion of FIGURE 6, illustrating the manner of mounting the source and an associated collimator tube in the device of the invention, a selectively installable collimator tube of larger beam-forming interior being shown in dotted form; and FIGURE 8 is a view in side elevation corresponding to the central portion of the device of FIGURE 4, but illustrating the selectively used form of clamp or mounting means employed for installation on a smaller pipe.

Earliest concepts of employment of radioactivity for measurement of density and similar properties of liquids in pipes constituted in essence simple adaptations of traditional methods and geometries for measuring absorption coefficients in laboratory measurements. Patent art dating long before actual construction of such devices illustrates the use of highly collimated pencil-like beams of minute dimensions placed on the opposite side of the pipe from similarly highly collimated detectors. For the reasons discussed in the general discussion above, it was found, when first attempts were made to put these concepts into practice, that such a "geometry" of the source and detector could be made to produce reasonable counting rates only with impractically large sources. It was immediately seen, when such geometries were tried, that they represented an impossible approach to practical utilization in factories, refineries, and other industrial locations. In order to increase the source utilization to what was, prior to the present invention, thought to be optimum, there was universally adopted the geometry shown schematically in FIGURE 1, the housings, etc., universally used with either clamp-on or in-line density gauges of commercial manufacture being omitted in this and certain of the following schematic drawings. As shown in FIGURE 1, the measurement is performed on the liquid in a pipe 10 by placing against the outside of the pipe (with the interposition of a thin housing wall, etc.,) a gamma-ray source 12, and placing adjacent to the opposite side a detector 14. Further increase of source utilization to produce higher counting rates was made by increasing the dimension of the detector in the plane transverse of the pipe, as shown in dotted form at 16 in this figure. It may be observed that in this type of geometry, whether using a large detector or a small one, the source 12 is placed essentially as closely as possible to the detector so that the detector subtends the maximum cone or solid angle of the radiations from the source for a detector of any given size.

It will be understood, of course, that the detector 14 and the larger detector 16 illustrated in dotted form are highly schematic in representation, a variety of possible shapes of detectors being used, or banks of detectors being used, to form the detecting area facing the source; it will also be understood that the dimension of this area in the direction parallel with the pipe is not illustrated, the advantages of long detectors in this dimension being obvious.

The detector size 14 or 16 of FIGURE 1 defines a cone angle 18 of the radiations from the source 12 which impinge on the detector area. The angle 18a subtended by the smaller detector area 14 is enlarged to the angle 18b by the enlargement of the detector. However, it will be observed that the added cone angle, i.e., the portion of angle 18b lying outside the angle 18a, produces an increased source utilization by adding detector response which results from gamma-rays which have traversed a shorter distance or thickness through the fluid. Further elongation of the detector will produce a still further component of gammas having a shorter and shorter path through the fluid due to the circular shape of the pipe 10. This has the dual effect of adding to the detector events or counts of a number greater than would be predictable from the solid angle added, but this same component of detector response also being relatively insensitive to density changes of the liquid. It is found that for any given size pipe with the geometry of FIGURE 1 employing any particular kind of detector with any particular size of source, there is an optimum dimension of the detector area as illustrated, when both the statistical fluctuations and the sensitivity (percent of change of average response per unit change in density) are considered, for obtaining maximum accuracy in any given amount of time. With extremely large sources (from one to two curies), or for extremely small pipes, this optimum is reached with a relatively small detector, while for small sources, or with large pipes, the optimum detector size is somewhat larger. Where this type of geometry is used in a universal-type density gauge, i.e., for use on a large variety of pipe sizes, the detector size is selected for optimum performance at some intermediate value of pipe size, and the performance at larger and smaller pipe sizes drops sharply from the optimum.

The present invention offers a structure which constitutes a substantial improvement in numerous respects upon the geometry shown in FIGURE 1, believed, prior to the present invention, to produce the maximum source utilization, i.e., the most accurate results obtainable with any given sized source within any required short period of measurement. The simplest form of this aspect of the invention is illustrated schematically in FIGURE 2. As there shown, the source 12 is substantially removed from the face of the pipe and is incorporated in a shield block 22 with a conical collimating aperture 24 subtending the detector 16, the angle of the cone 18c being substantially smaller than the corresponding angle of the cone 18b in the geometry of FIGURE 1. Accordingly, the total radiation falling on the detector 16 is reduced. However, it is found that for any commonly used size of pipe 10, there is produced sufficient increase in sensitivity with the same size of detector area (in the dimension involved, of course) that the loss of sensitivity involved in enlarging the detector from the size which is optimum for the FIGURE 1 geometry is much less than in the former case, i.e., that the sensitivity in the geometry of FIGURE 2 is substantially greater than the sensitivity with the corresponding size of detector in the geometry of FIGURE 1, and that the reduced solid angle of the source seen by any given size detector is not sufficient in its deleterious effect on statistics in the measurement with any commonly encountered fluids to overcome the benefits obtained by increasing the detector size. The net result is found to be that the overall accuracy is at least as good, and in most cases substantially better, than with a geometry such as that of FIGURE 1. The exact theory of the improved result obtained is unknown. The improvement in sensitivity does not appear to be fully explainable on the basis of the difference in the minimum path length 20c at the extremities of the cone from that of the minimum path length 20a in the geometry of FIGURE 1 using the same size detector. On the contrary, it would appear to be reasonably expected that the path length differential should work adversely in the geometry of FIGURE 2. The only known explanation lies in the great reduction in the scattering response of the detector. It will be observed that the conical collimation blocks the emissions which can be detected by the detector only as a result of scattering, a sensitivity-reducing effect in FIGURE 1.

In addition to the source utilization advantage, there are many other practical advantages for the geometry of FIGURE 2 over that of FIGURE 1. The shielding of the source is omitted in FIGURE 1, but it will readily be seen that in the device of that figure, it is necessary to provide a bulky shield over virtually the entire pipe 10 in order to prevent dangerous external radiation hazards. Additionally, of course, the source 12 must be incorporated in the periphery of, for example, a rotating shield portion in order that it can be fully shielded when used in a clamp-on source housing, as previously discussed. In the device of FIGURE 2, on the other hand, no shielding is required outside of the collimation cone, so that all shielding may be self-contained in the housing for the source assembly, and the rotating shield 22 accordingly serves the purpose of full shielding in all directions except the forward direction in the operating position, being rotated to the fully shielded position wherein the collimation opening 24 is shielded by the stationary block 26 (illustrated in larger width than required).

FIGURE 3 illustrates a still further improvement on the geometry. Here the source 12 is incorporated in a stationary shield 28, and a movable shutter block 30 is interposed in the path for complete shielding. This geometry has the great advantage over those of both FIGURES 1 and 2 in that there is introduced by the shutter mechanism no uncertainty or inaccuracy of source-and-detector collimation due to inexact end-stopping of the motion required in shutter operation. The portion of the figure shown in solid form illustrates the manner of use with a pipe 10 of the same diameter as those previously discussed, while the dotted indication shows the application to a much larger pipe 10a, only the collimation cone angle being altered. It will be observed that the reduction in source solid angle produced by the added spacing required for the shutter block is negligible at the large pipe sizes at which the statistics are the important error factor.

In applying these principles to the practical measurements of densities in industrial piping, which commonly encountered materials, i.e., in the devising of a fully satisfactory clamp-on type density gauge suitable for use with all common encountered pipe sizes, certain criteria are found to be critical to fully satisfactory results. In general, the substances for use with which such gauges are desired are of low specific gravity, usually of approximately the order of magnitude, of less than, that of water, the measurement of densities in a range, for example, of from 1.10 to 1.15 being typical with an accuracy or overall error of the order of one percent. The pipe sizes normally encountered cover a range of from about four inches to sixteen inches. To cover this range with the required accuracy (which will vary somewhat with material and pipe size), it is found that a "universal" construction should employ, in the geometry illustrated, with an ion chamber detector of high efficiency and of round configuration, a source of from one-quarter to one curie with a detector area of from 4 to 8 inch diameter. As with the geometry of FIGURE 1, optimum acuracy, including both the error factors of efficiency (slope of average detector output as a function of density) and statistical variation, will be obtained at some particular pipe size for any given material under measurement, with the rise in statistical variation overcoming the increase in efficiency at larger pipe sizes and the loss of efficiency overcoming the reduced statistical error at smaller pipe sizes. However, the optimum condition for any given pipe size is reached at substantially greater detector area than in the FIGURE 1 geometry, the advantage in this respect being greatest at largest pipe sizes. Where a system is to be designed in accordance with the present principles for a particular fluid, source strength, and pipe size, etc., detector area is the variable, and the optimum condition is obtained at the point wherein incremental detector dimension increase in the transverse plane produces greater incremental error due to decrease in measurment efficiency than the error decrement due to improvement of statistics. For a universal gauge employing an electronic system of normal error, the optimum is obtained, under the conditions mentioned, with a pipe size about twice the diameter of the detector, but acceptable accuracy normally is obtained over a pipe-size range making the detector dimension from one-third to as great as one-and-one-half times the pipe diameter.

Where measurements are to be performed on liquids of unusually high density, in pipes of such small size as to make prohibitive the loss of source-solid-angle (for any given size detector) required for substantially perfect formation of the beam (spacing of the source from the pipe by the distance required for substantially complete absorption in lead), optimum conditions as regards accuracy may in certain cases be obtained by partial collimation, the collimator (and the spacing of the source from the pipe) being shortened to the point where further shortening reduces sensitivty to an extent not compensated by reduction of statistical error.

It will be obvious that completely exact coincidence of the beam and detector area are not required for obtaining the principal benefits of the geometry, the effects of the beam extending beyond the detector, or vice versa, by even substantial angles being small as compared with the difference between the substantially hemispherical ebam of FIGURE 1 and a collimation cone even roughly coextensive with the detector. It will also be obvious that a large part of the collimation benefit is obtained from the confining of the beam to the detector in the plane including the source and the axis of the pipe, particularly where the detector area is of substantially the same dimension in both directions, rather than being elongated in the dimension along the pipe.

For conversion or interchangeability of pipe size, the only provision required in addition to the adjustable or selectable mounting means is the employment of interchangeable collimating or beam-confining shield apertures in the source housing, so that the cone angle may be adjusted to approximately coincide with the detector area for any given size pipe.

In FIGURES 4 through 8 is shown a commercial embodiment of the invention, incorporating the general principles of construction already described, together with certain other novel and advantageous features connected therewith. In FIGURES 4 through 7, the device is shown as installed on a large pipe 10b, and in FIGURE 8 as installed on a smaller pipe 10c.

The source housing 32 and the detector housing 34 are connected and mounted by a clamp mounting generally indicated at 36 (36a in FIGURE 8). The detector is an ionization chamber 38 of a high-efficiency high-pressure type, elongated in the direction of the source for added efficiency. As will be understood by those skilled in the art, the actual effective area of such a detector (as is true to some extent with any detector) is not sharply defined, the maximum response being obtained to axial radiations with the loss of sensitivity at the edges being gradual. For practical purposes, however, the detector may be considered as having an effective detecting area approximating its diameter, in this case six inches. The detector is provided with a conventional external electrical connection 40.

The clamp mounting has a round clamping portion 42 (42a in FIGURE 8) adapted to fit the size of pipe, and tabs or ears 44 clamped together by bolts 46 and nuts 47. The clamping portions 42 are secured as by welding to brackets 48 (48a in FIGURE 8) which are secured to the housings by bolts 50 and nuts 52, these constituting disengageable fastening means permitting selective variation of the distance between the housings provided by the clamping or mounting means.

Within the source housing 32, a radiation shield 54 of lead occupies the rear portion of the steel housing shell 56. The front portion 58 of the housing is enlarged and forms a chamber containing the parts later to be described.

The central front portion of the shield 54 has a bore or well 60 in which is mounted a tubular beam-forming liner or collimator tube 62, also of lead or similar shielding or absorbing material. As indicated in dotted form in FIGURE 7, the inner diameter of the tube or collimator 62 is varied in forming the beam of the desired cone angle.

A thick strap 64 extends across the front of the shield and serves to secure it rigidly in place and to form the sole support for the source assembly to be described now.

The source assembly has a mounting portion comprising a plate or web 66 shaped to index in proper location in a recess in the strap 64, to which the plate is secured by screws 68. Secured to the plate 66, which bridges the bore 60 in the shield, is a hollow tubular stem source support 70 which has at its inner end a shoulder 72 which serves to mount a small cylindrical source 12a, retained in place by crimping of the end 74 of the support tube 70, this end being machined down to a thickness appropriate for such forming. The source 12a contains approximately a half curie of a suitable isotope such as cesium 137.

The outer end of the collimator tube 62 is secured by the plate 66, against which it abuts, while the inner end rests on the bottom surface 76 of the bore. It will be seen that with this construction, the source is rigidly mounted at the center of the bottom of the bore; the tube 62 is selected from a set of varying inner diameters in accordance with the pipe size and is held in place by the plate 66, the removal of the screws 68 simultaneously releasing the source and the collimating sleeve to permit simple and easy replacement of either component. The use of a simple cylindrical sleeve provides a very simple and inexpensively fabricated collimator or beam-confining means, the source support, both because of its material and because of its hollow interior, presenting substantially no absorption interfering with the conical beam pattern directed at the detector.

Extending through the shield in an off-center position is a shaft aperture 78 in which is mounted a shaft 80. At the inner end, in the front portion 58 of the housing, a wheel or disc 82 is mounted on the shaft. The disc 82 has a large aperture 84 and two smaller apertures 86 and 88 symmetrically disposed about the shaft axis. A thick lead plug 90 and a thinner lead plug 92 have hub portions 94 and 96 respectively fitting the apertures 86 and 88 in the disc 82 for position indexing, and these plugs are secured to the disc by bolts or screws 98 and 100. The thicker plug 90 is of sufficient thickness to constitute a complete radiation shield shutting off the beam when placed over the source-and-collimator assembly just described. The thinner plug 92 is of sufficient thickness to simulate the absorption of a medium to be measured and thus to produce a "standard" or calibrating response in the detector upon rotation of the disc 82 from the "open" position shown in FIGURE 6 to the position in which the "standard" plug is placed in front of the source. The calibrating or standard plug 92 may, if desired, be replaced if the standard response of the detector is desired to fall within a particular range when installed on an empty pipe of a particular size. At the outer end of the shaft is an operating handle 102 marked with the three positions discussed above, and having apertured tongues 104 selectively mating with a fixed tongue 106 on the housing to accept the hasp 108 of a padlock 110, thus permitting locking in any position.

As illustrated in FIGURE 8, the clamp mount for small pipes, which is readily interchangeable for selection of desired pipe size, differs slightly in detail from the clamps for the larger-size pipes, side plates 112 being provided to prevent access to the region of the radiation cone, both for purposes of personnel safety and for purposes of prevention of interference with the measurement by the presence of spurious absorbers or scatterers.

It will readily be seen that many variations of the device described are possible without departing from the teachings of the invention. Above and beyond the fact that the particular embodiment described in detail is only one of many embodiments of the device schematically shown in FIGURE 3, variations of advantageous constructional features of the clamp-on radioactivity density gauge device illustrated may readily be devised. For example, although the use of the type of collimator illustrated is highly advantageous and simple, it is obviously possible, where desired, to vary the conical angle of radiations by other means. For example, a single collimator tube may be employed with suitable means for adjusting the position of the source or the tube to vary the beam size, or the beam may be varied by mounting of the series of collimators on a wheel similar to the wheel 82. However, except for special applications or purposes, such variations fail to obtain, in one respect or another, the full advantages of the structure illustrated as regards simplicity and cost, coupled with convenience.

In addition to the variations possible in construction of a device for the particular purposes mentioned, it will be seen that the illustrated device has structural features which are readily adapted to use for devices for somewhat different purposes. For example, adaptations of the geometry of FIGURE 3 may readily be made to industrial and similar measurements other than on the contents of pipes. The advantages described above may be obtained, for example, although with slightly different dimensioning, etc., in the making of measurements of density of materials in bulk and in other uses of radiation measurements, particularly with gamma-rays. The manner of design of particular systems will be readily devised, the adaptation of the principles discussed in connection with measurements on circular pipes being adaptable to other shapes. Depending upon the particular use, the angle of the conical beam employed should be between 10 degrees and 35 degrees, smaller angles in general being incapable of sufficiently accurate measurements with the limited source sizes which can be used, and larger cone angles serving little purpose in industrial process measurements, the conical-beam geometry not adding sufficiently to the sensitivity to overcome the loss of source solid-angle. For measurements on small uniform thicknesses where efficiency, rather than statistical error, is the prime consideration, the detector may be annular (as by shielding its center) and the center of the conical beam may be shielded to lengthen the average path through the liquid or other material under measurement, such a form of beam adding substantially to sensitivity even with a full circular detector, but not as advantageously. Likewise, although substantial coinciding of the cone angle with the detector area is most desirable as regards accuracy, a smaller cone angle may be used, if desired to minimize external radiation and shielding requirements. It will also be obvious that the simple right circular conical configuration shown may, where cost is warranted, be replaced by other shapes of cones fixed by detector area, notably, in the case of a pipe device, by a shape elongated in the direction parallel with the axis of the pipe. Also, although less advantageous from the overall aspect for most uses, the detector may be provided with a beam-former, either in addition to or in substitution for the conical collimator at the source.

It may also be noted that the use of an elongated detector such as illustrated, the detecting region extending in the direction away from the source to at least the same extend as the dimension facing the source in the plane transverse to the pipe, offers the advantage that the detecting area is effectively varied as the source-to-detector distance is varied. This advantage is obtained to a substantial extent even when the source is placed directly on the pipe, as in FIGURE 1, but is of particular value in combination with the conical collimation here used, because this elongation, in the absence of confinement of the beam to the detector, tends to increase the portion of the detector response caused by scattering from outside the desired cone.

A particular construction of the illustrated embodiment uses 0.4 curie of cesium 137 as the source with the 6-inch detector, the lead collimator tubes being approximately 4 inches long and spaced by approximately the same distance from the pipe, the inner diameter of the collimator tubes being from ⅝ to ⅞ inch. The detector, an ion chamber using a high-gamma-efficiency filling (a Freon) at approximately 7 atmospheres pressure, is of 9-inch length, with 6-inch diameter and hemispherical ends.

It will be obvious from what has been said above that the patent protection to be afforded the invention should not be limited to the particular embodiments illustrated and described, and the scope of the patent protection should accordingly be determined from the appended claims.

What is claimed is:

1. In radioactivity source-and-detector apparatus for measurement of density and similar properties in industrial process materials-flow systems of the type having:
    (a) a source-housing having therein a gamma-ray-emitting body dimensioned to form essentially a point source,
    (b) a detector-housing having therein a gamma-ray detecting means and
    (c) mounting means for installing the respective housings in spaced relation for placement on opposite sides of a flow-path of a process material under measurement, the improvement characterized by:
    (d) the gamma-ray-detecting means having a detecting area facing the source of at least one dimension between one-third and one and one-half times the spacing between the housings and
    (e) the source-housing having means for confining the solid angle of the emitted radiation to approximate coincidence with the detecting area.

2. The improved apparatus of claim 1 further characterized by
    (f) the source and confining means being stationary in the source housing and having
    (g) a movable shutter shield on the source housing having positions shielding and unshielding the source.

3. In radioactivity source-and-detector apparatus for measurement of density and similar properties of fluids in round pipes, of the type having
    (a) a source-housing having therein a gamma-ray-emitting body dimensioned to form essentially a point source,
    (b) a detector-housing having therein a gamma-ray detecting means and
    (c) means for mounting the housings on opposite sides of a round pipe, the improvement characterized by:
    (d) the gamma-ray detecting means forming a detecting area having a dimension in the plane transverse to the pipe of between one-third and one-and-one-half times the diameter of the pipe, and (e) the source-housing having means for confining the solid angle of the emitted radiation to approximate coincidence with the detecting area.

4. The improved apparatus of claim 3 further characterized by:
(f) the mounting means being selectively adapted for affixation to pipes of differing sizes and
(g) the radiation-confining means being selectively adapted for varying the solid angle of the emitted radiation.

5. The improved apparatus of claim 3 further characterized by having the solid angle of the emitted radiation in the form of a circular cone having an included angle between 10 degrees and 35 degrees.

6. In radioactivity apparatus, the improved beamed radioactivity source construction including
(a) a shield block having a bore extending to the interior thereof,
(b) a radiation source,
(c) a mounting member disengageably secured to the face of the block and bridging the bore, and
(d) a substantially radiation permeable support member extending axially of the bore and having its outer end secured to the mounting member and its inner end secured to the source and positioning the source at the bottom of the bore.

7. The beamed radioactivity source construction of claim 6 having a removable beam-forming liner of shielding material in the bore surrounding the support member.

8. The beamed radioactivity source construction of claim 7 wherein the liner has its inner end abutting against an internal surface of the shield bore and its outer end abutting against the mounting member, so that the entire assembly so formed is secured in position by the securing of the mounting member.

9. A universal clamp-on radioactivity device for measurement of density of materials in pipes comprising:
(a) a gamma-ray source of substantially point dimensions,
(b) a gamma-ray detector facing the source and having an active volume of dimension extending away from the source at least equal to any transverse dimension and
(c) means for positioning the source and detector on opposite sides of various sizes of pipe, whereby the effective area of the detector responsive to direct radiations from the source varies substantially with pipe size.

10. The device of claim 9 having means for forming the source radiation traversing a pipe to a solid angle pattern approximately subtending the effective area of the detector for each pipe size.

11. In radioactivity source-and-detector apparatus for measurement of density and similar properties in industrial process materials-flow systems of the type having:
(a) a source-housing having therein a gamma-ray-emitting body dimensioned to form essentially a point source,
(b) a detector-housing having therein a gamma-ray detecting means and
(c) mounting means for installing the respective housings in spaced relation for placement on opposite sides of a flow-path of a process material under measurement, the improvement characterized by:
(d) the gamma-ray-detecting means having a detecting area facing the source of at least one dimension between one-third and one and one-half times the spacing between the housings, (e) the source-housing having means for confining the solid angle of the emitted radiation to the region subtended by the detecting area,
(f) the source and confining means being stationary in the source housing and having
(g) a movable shutter shield on the source housing having positions shielding and unshielding the source, and
(h) a movable gamma ray absorber of substantially lower absorption than the shutter shield coupled thereto to form a unitary assembly having a third position in addition to said shielded and unshielded positions, the absorber being interposed before the source in said third position for calibration of the device.

12. In radioactivity source-and-detector apparatus for measurement of density and similar properties of fluids in round pipes, of the type having:
(a) a source-housing having therein a gamma-ray-emitting body dimensioned to form essentially a point source,
(b) a detector-housing having therein a gamma-ray detecting means and
(c) means for mounting the housings on opposite sides of a round pipe, the improvement characterized by:
(d) the gamma-ray detecting means forming a detecting area having a dimension in the plane transverse to the pipe of between one-third and one-and-one-half times the diameter of the pipe,
(e) the mounting means being selectively adapted for affixation to pipes of differing sizes, and
(f) interchangeable beam-defining shielding collimators confining the solid angle of the emitted radiation to approximate coincidence with the region subtended by the detecting area at various distances between the housings.

13. The improved apparatus of claim 12 having:
(g) the source being disposed in a shield having an opening of relatively large cross-sectional dimensions directed toward the detector, the shielding collimators comprising tubular shielding members of varying inside size and of uniform outside size snugly fitting the opening.

14. The improved apparatus of claim 13 further characterized by the source being centrally supported at the bottom of the opening by a radiation-permeable support member extending from, and supported at, the mouth of the opening, the tubular shielding member surrounding the support.

15. The improved apparatus of claim 14 further characterized by a mounting web bridging the opening at its mouth and mounting the support member, and disengageable means for securing the outer portion of the mounting web, the tubular shielding member terminating at the mount and being secured solely by engagement with the mounting web, whereby the source and the tubular shielding member are released by disengagement of the securing means.

References Cited by the Examiner
UNITED STATES PATENTS

| | | | |
|---|---|---|---|
| 2,640,936 | 6/1953 | Pajes | 250—105 X |
| 2,938,124 | 5/1960 | Boyd | 250—83.3 |
| 3,070,692 | 12/1962 | Ohmart et al. | 250—43.5 |
| 3,100,395 | 8/1963 | Morley | 250—45.5 X |

RALPH G. NILSON, *Primary Examiner.*

ARCHIE R. BORCHELT, *Examiner.*